US012760765B2

(12) United States Patent
Scaglia et al.

(10) Patent No.: US 12,760,765 B2
(45) Date of Patent: Oct. 13, 2026

(54) SHOE FOR HYDRODYNAMIC BEARING

(71) Applicant: EUROBEARINGS S.R.L., Cortemaggiore (IT)

(72) Inventors: Davide Scaglia, Piacenza (IT); Steven Chatterton, Rho (IT); Paolo Pennacchi, Milan (IT)

(73) Assignee: EUROBEARINGS S.R.L., Cortemaggiore (IT)

( * ) Notice: Subject to any disclaimer, the term of this patent is extended or adjusted under 35 U.S.C. 154(b) by 50 days.

(21) Appl. No.: 18/834,136

(22) PCT Filed: Jan. 31, 2023

(86) PCT No.: PCT/IB2023/050838
§ 371 (c)(1),
(2) Date: Jul. 29, 2024

(87) PCT Pub. No.: WO2023/148614
PCT Pub. Date: Aug. 10, 2023

(65) Prior Publication Data
US 2025/0146528 A1 May 8, 2025

(30) Foreign Application Priority Data
Feb. 1, 2022 (IT) ........................ 102022000001694

(51) Int. Cl.
*F16C 33/20* (2006.01)
*F16C 17/24* (2006.01)

(52) U.S. Cl.
CPC .......... *F16C 33/208* (2013.01); *F16C 17/243* (2013.01); *F16C 2208/32* (2013.01); *F16C 2208/36* (2013.01); *F16C 2233/00* (2013.01)

(58) Field of Classification Search
CPC ...... F16C 17/03; F16C 17/06; F16C 2233/00; F16C 17/20–246
See application file for complete search history.

(56) References Cited

U.S. PATENT DOCUMENTS

| | | | |
|---|---|---|---|
| 2006/0165335 | A1 | 7/2006 | Yoshimura et al. |
| 2011/0256008 | A1 | 10/2011 | Hattori et al. |

FOREIGN PATENT DOCUMENTS

| | | | | |
|---|---|---|---|---|
| EP | 2 348 218 | A1 | | 7/2011 |
| JP | 56-74632 | A | | 6/1981 |
| JP | S6095215 | A | * | 5/1985 |
| JP | 2006-112602 | A | | 4/2006 |

OTHER PUBLICATIONS

International Search Report mailed on Mar. 21, 2023 in PCT/IB2023/050838 filed on Jan. 31, 2023 (citing references 1, 2 & 15-17 therein, 4 pages).

* cited by examiner

*Primary Examiner* — John Olszewski
*Assistant Examiner* — Aimee Tran Nguyen
(74) *Attorney, Agent, or Firm* — Oblon, McClelland, Maier & Neustadt, L.L.P.

(57) ABSTRACT

A shoe for hydrodynamic bearing configured to be placed in contact with a lubricating fluid is described, the shoe includes a base made of metallic material, a coating made of insulating material coupled to the base, and a temperature probe. The probe includes a temperature sensor positioned inside the coating and a conducting wire extending between a first end connected to the temperature sensor and a second end facing outside the coating and configured to be in contact with the lubricating fluid.

15 Claims, 4 Drawing Sheets

SHOE FOR HYDRODYNAMIC BEARING

The present invention relates to a shoe for thrust or guide bearings, or combined guide and thrust bearings, of the hydrodynamic type.

The present invention also relates to a method for producing such a shoe.

The present invention is useful for axial or radial bearings coated with insulating material, generally polymeric, used inside rotating machines or rotors, for marine, aeronautical, oil & gas and power generation applications.

It is known in the state of the art to monitor the performance of hydrodynamic bearings by checking for the occurrence of possible power loss and/or by measuring the temperature of the shoe.

In fact, data collection, both of instantaneous temperatures and of temperatures over a long period, makes it possible to assess the health of the shoe and to prevent possible future damage.

It is well known that the shoes forming hydrodynamic bearings comprise a metallic base, usually steel, on which a layer of white metal or polymeric insulating material, e.g., PEEK, is placed in contact with a lubricating fluid.

In the case of a shoe coated in white metal, the temperature of the shoe is monitored by placing a temperature probe inside the metallic base of the shoe, just below the surface of the white metal.

Since white metal possesses excellent thermal conductivity, temperature monitoring by this method is quite reliable. In fact, in such types of shoes, after a short period of operation, a uniform temperature distribution is established between the steel metallic base and the white metal layer: that is, both come up to regime and, in the event of any changes, the probe detects a temperature difference.

However, the same method is inapplicable in the case of shoes which have the coating layer made of polymeric material, and this results from the poor thermal conductivity of the polymer itself. In fact, during the operation of the bearing, most of the heat from the lubricating fluid film is isolated from the temperature probe installed in the metallic base of the shoe, since the heat produced is partially, if not totally, dissipated through the polymeric layer before reaching the temperature probe.

In an attempt to overcome this problem, shoes have been developed comprising 'bleed holes', namely provided with one or more holes in the polymeric coating layer, in a perpendicular position with respect to the temperature probe. Such holes can involve only the polymeric layer or they can go directly to the temperature probe, thus also involving the metallic base. In the second case, a further by-pass hole is usually provided for the exit of the lubricating fluid. The presence of the hole allows to improve the accuracy of the measurement as the lubricating fluid, through the hole, passes the insulating layer and comes into contact, in the first case, with the base of the shoe or, in the second case, directly with the temperature probe.

Disadvantageously, the presence of the bleed holes generates pressure losses on the lubricating fluid film.

Disadvantageously, bleed hole techniques have proven to be unreliable in terms of response time under various operating conditions.

In fact, for example, a test was conducted on a motor rotating a shaft, with axial forces being balanced by a thrust bearing having PEEK-coated shoes, with bleed holes up to the temperature probe. The test involved bringing the shaft up to regime conditions until the bearing indicated a fault, which could be detected by a rapid increase in bearing temperature or motor power. Such a test showed that the temperature probe could not immediately detect the local heating caused by the contact between the shaft and the PEEK-coated shoes.

The object of the present invention is to overcome the above-mentioned drawbacks, and in particular to provide a shoe for hydrodynamic bearing which allows reliable and precise measurement of the temperature of the lubricating fluid, thus preventing possible damage to the bearing.

It is a further object of the present invention to provide a shoe which is easy to produce and in which the ability to accurately detect temperature maintains its efficiency over time.

The specified technical task and objects are substantially achieved by a shoe for hydrodynamic bearing comprising the technical features set forth in one or more of the appended claims.

Further features and the advantages of the shoe according to the present invention will result apparent from the approximate and thus non-limiting description of a preferred, but not exclusive, embodiment of a shoe for hydrodynamic bearings as illustrated in the accompanying drawings, in which.

Figure 4:
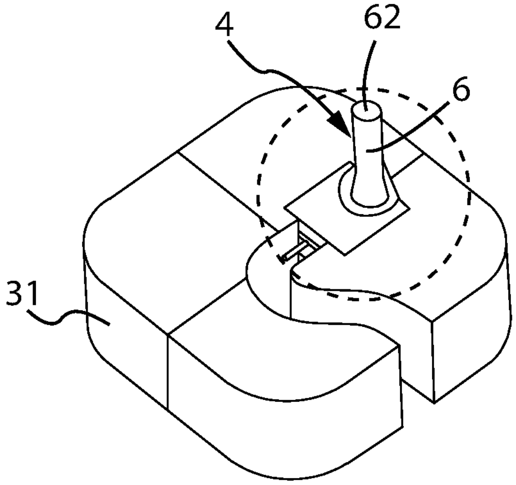
FIG. 4 shows a perspective view of a first configuration of a detail of a portion of coating of a shoe in accordance with a second embodiment of the present invention.
Figure 4A:
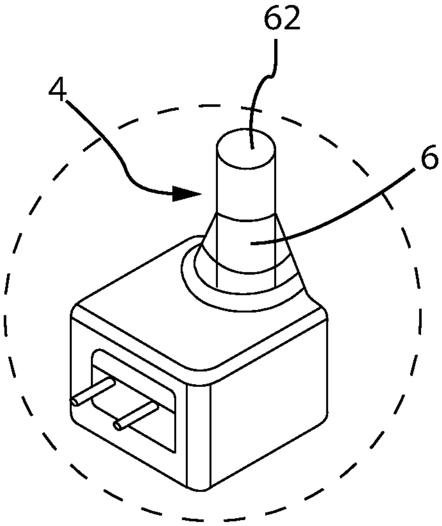
Figure 5:
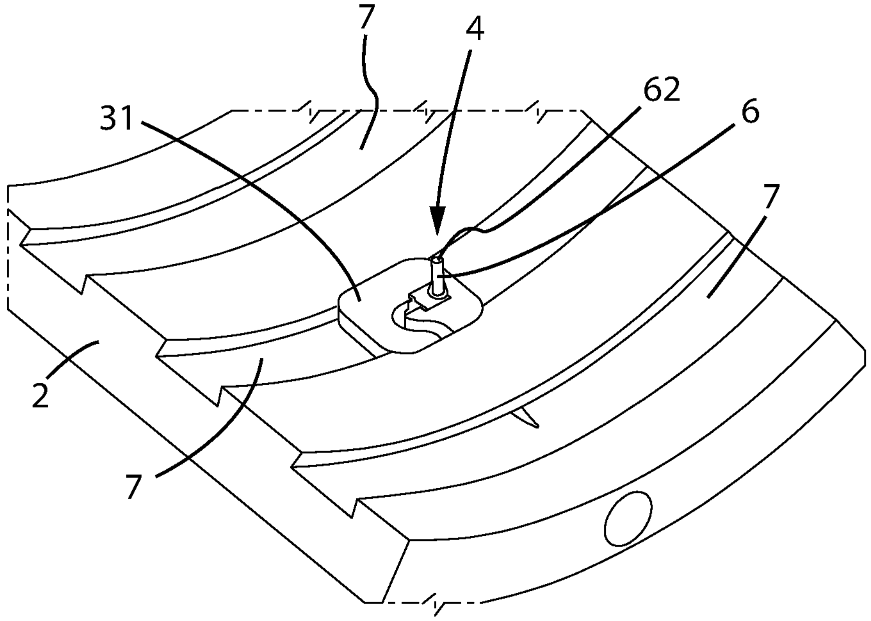
Figure 6:
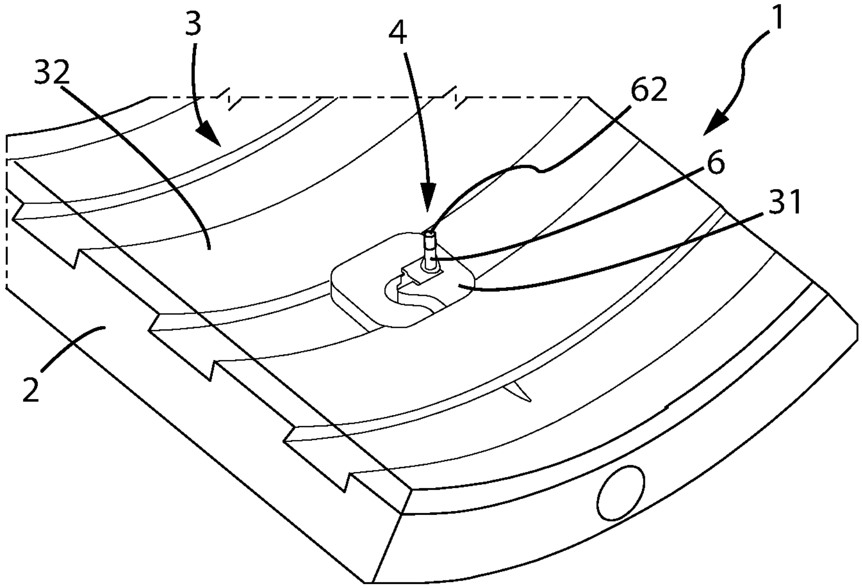
Figure 9:
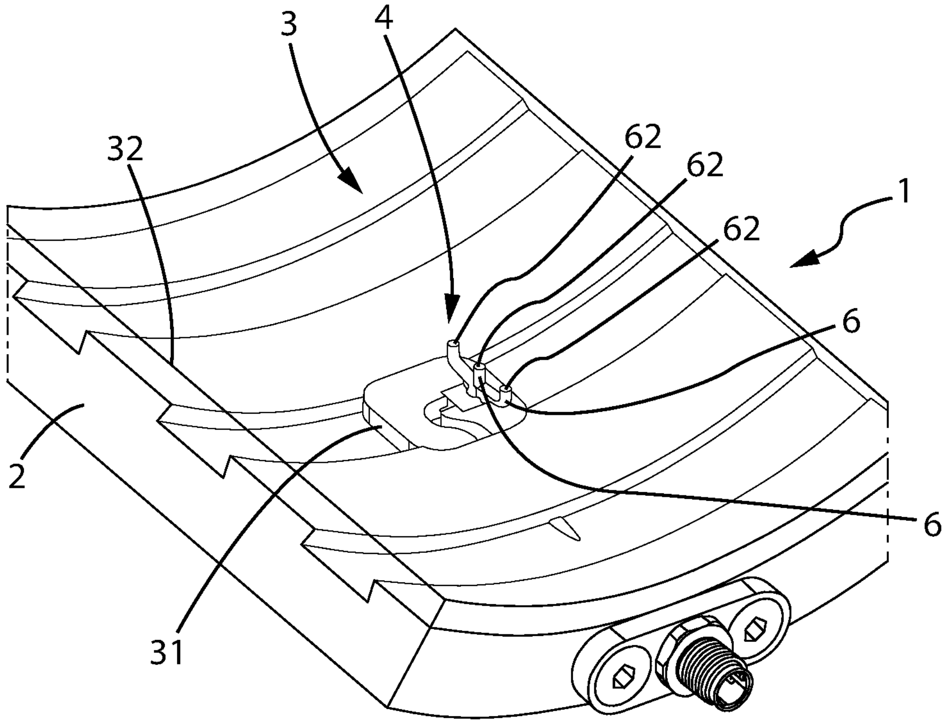
Figure 7:
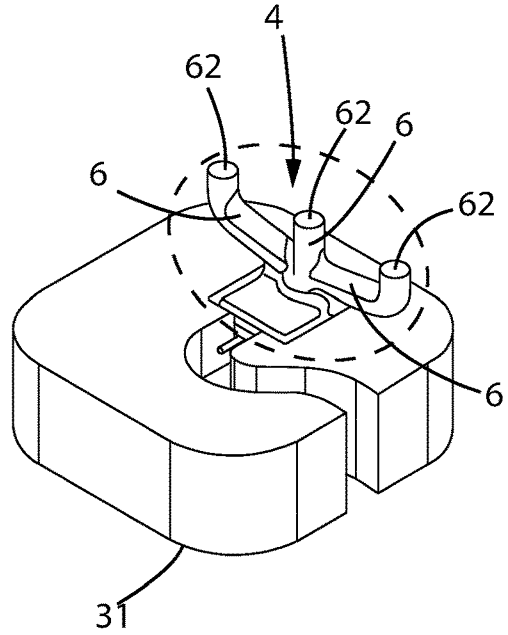
Figure 7A:
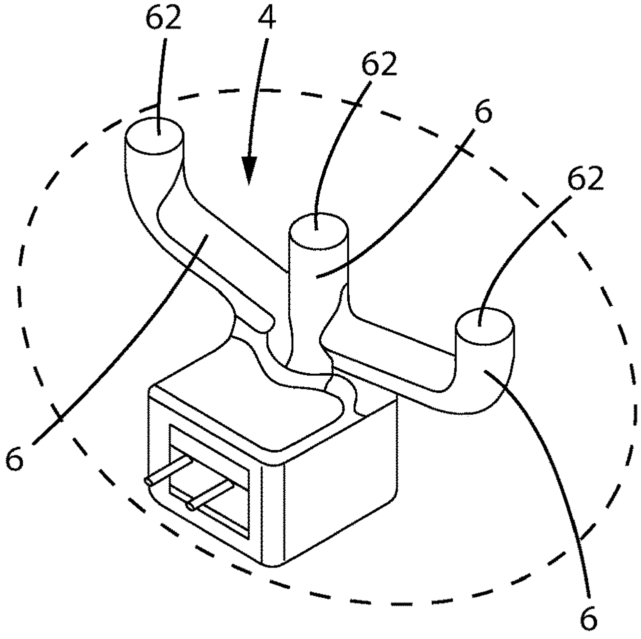
Figure 8:
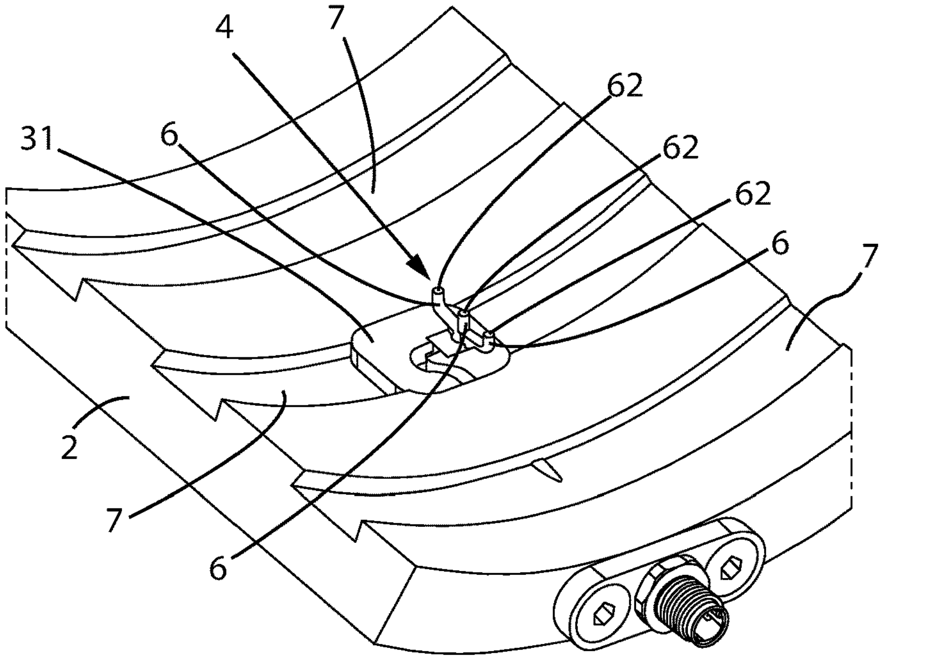

FIG. 4*a* shows the detail of FIG. 5 without coating portion;

FIG. 5 shows a perspective view of a shoe portion in which the detail of FIG. 4 is inserted;

FIG. 6 shows the shoe of FIG. 5 with a further coating portion;

FIG. 7 shows a perspective view of a second configuration of a detail of a coating portion of a shoe in accordance with the second embodiment of the present invention;

FIG. 7*a* shows the detail of FIG. 7 without coating portion;

FIG. 8 shows a perspective view of a base of a shoe in which the detail of FIG. 7 is inserted;

FIG. 9 shows the shoe of FIG. 8 with a further coating portion.

With reference to the attached Figures, a shoe is described, marked with reference number 1, for hydrodynamic bearing. Also forming part of the present invention is a bearing (not illustrated in the accompanying Figures) comprising the shoe 1 as described below.

The shoe 1 in accordance with the present invention is configured to be placed in contact with a lubricating fluid.

The shoe 1 comprises a base 2 made of metallic material. Such a base 2 is, for example, made of steel. The shoe 1 further comprises a coating 3 made of insulating material, coupled with the base 2. For example, the base 2 and the coating 3 are mechanically coupled. In particular, the base 2 and the coating 3 have respective profiles facing and complementary to each other, and the coating 3 is at least partly inserted in the base 2. Preferably, such a mechanical coupling is obtained by means of casting a melted insulating material on the base 2 to create the coating 3. The mechanical coupling can also be obtained by gluing the coating 3 on the base 2. Still preferably, the coating 3 is polymeric.

The shoe 1 comprises a temperature probe 4. The temperature probe 4 is configured to detect a temperature of the lubricating fluid.

In particular, the probe 4 comprises a temperature sensor 5, which is placed within the coating 3.

The temperature sensor 5 is entirely placed within the coating 3. In other words, the entire temperature sensor 5 is located within the coating 3.

The probe 4 also comprises a conducting wire 6, which connects the temperature sensor 5 with the lubricating fluid. Specifically, the conducting wire 6 extends between a first end 61, which is connected to the temperature sensor 5, and a second end 62, which is facing outside the coating 3 and configured to be in contact with the lubricating fluid.

In other words, according to the present invention, the temperature sensor 5 is immersed within the coating 3. In particular, the temperature sensor 5 is completely immersed within the coating 3. Advantageously, being the coating 3 made of an insulating material, the heat of the lubricating fluid film is conducted by the conducting wire 6 directly up to the temperature sensor 5, which, being thermally insulated, will not be affected by other cold/hot bodies. Advantageously, the temperature sensor 5 is hardly subject to temperature variations and the temperature of the lubricating fluid can be detected correctly and without response delays. Consequently, the temperature value measured by the probe 4 is more reliable with respect to the currently known methods/devices.

It should be noted that, in the present description, conducting wire 6 is intended as thermally conducting wire.

For example, the conducting wire 6 is made of aluminium or copper.

According to embodiments of the present invention, shown for example in FIGS. 7-9, the probe 4 comprises two or more conducting wires 6, each connected to the temperature sensor 5. In such a case, each conducting wire 6 has a first end 61 connected to the temperature sensor 5, and a second end 62 facing outside the coating 3 and configured to be in contact with the lubricating fluid. Advantageously, the temperature sensor 5 detects the temperature of the lubricating fluid in various points.

The probe 4 can also provide a plurality of temperature sensors 5, each connected to a respective conducting wire 6.

In greater detail, according to the present invention, the coating 3 preferably comprises a first portion 31 connected to the base 2 and a second portion 32 placed on the first portion 31 and configured to contact the lubricating fluid. The first portion 31 and the second portion 32 are seamlessly connected. The second portion 32 is preferably in the form of a continuous layer placed covering the first portion 31 and the conducting wire 6.

In fact, it should be noted that the conducting wire 6 is at least partly surrounded by the second portion 32. In the points of the shoe 1 in which the first portion 31 is not present, the second portion 32 is directly in contact with the base 2.

Preferably, the base 2 comprises at least one mechanically anchored groove 7 configured to house the first portion 31. In accordance, the second portion 32, which is deposited in the form of a layer on the first portion 31, extends within and outside the groove 7. For example, the groove 7 has a dovetail shape.

Preferably, the first portion 31 and the second portion 32 are made of the same material.

Still preferably, at least one of the first portion 31 and the second portion 32 comprises PEEK and/or PTFE. The first portion 31 and the second portion 32 can also be made with other insulating materials, alternative to those mentioned above.

Figure 1:
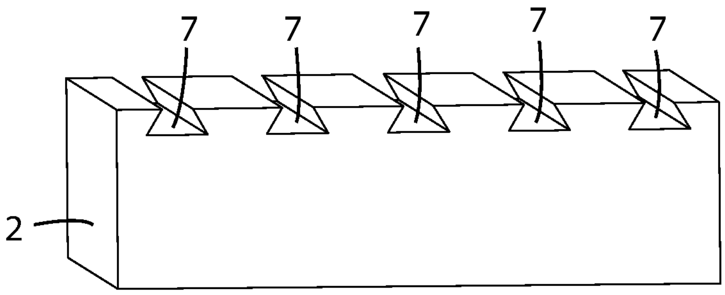
FIG. 1 shows a perspective view of a portion of a shoe lacking coating.
Figure 2:
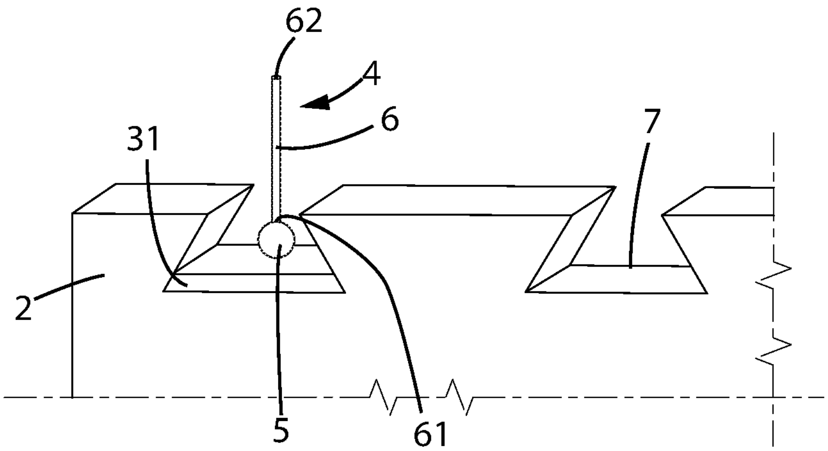
FIG. 2 shows an enlarged front view of the shoe of FIG. 1 with a first portion of the coating in accordance with a first embodiment of the present invention.
Figure 3:
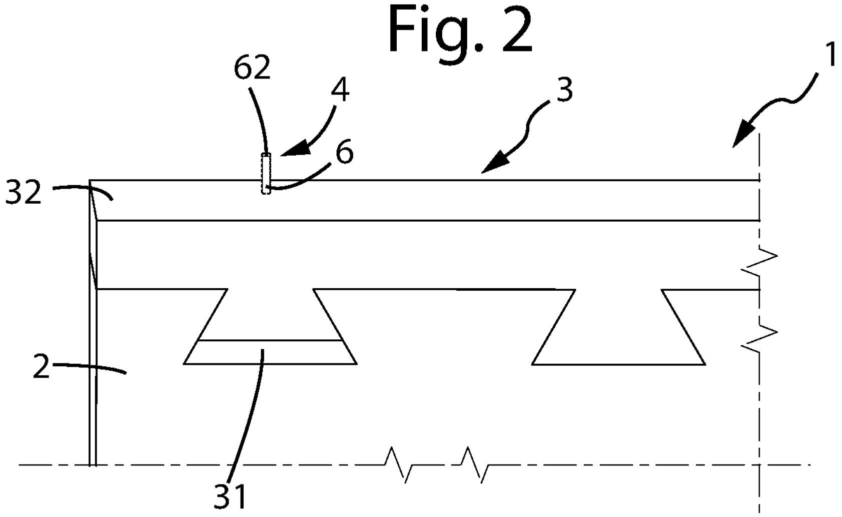
FIG. 3 shows the shoe of FIG. 2 with a further coating portion.

According to a first embodiment of the present invention, shown in FIGS. 1-3, the temperature sensor 5 is interposed between the first portion 31 and the second portion 32.

According to such an embodiment, the first portion 31 is also in layer form. In accordance with such an embodiment, the temperature sensor 5 is placed on the first portion 31 and is surrounded by the second portion 32. Such an embodiment is preferable in the case of axial shoes for thrust bearings, but can also be used for radial shoes of guide bearings.

The first portion 31 is placed uniformly within at least part of the groove 7.

In accordance with such an embodiment, the first portion 31, for example, is at least 1 mm thick.

In particular, the first portion 31 has a thickness which is preferably less than the depth of the groove 7. Thus, the second portion 32 is also partially inserted in the groove 7. Advantageously, the coating 3 achieves an overall appropriate coupling with the base 2, despite being composed of two distinct portions.

In accordance with a second embodiment, alternative to the first and visible in FIGS. 4, 5-7, and 8-9, the temperature sensor 5 is immersed in the first portion 31. In particular, in accordance with such an embodiment, the temperature sensor 5 is immersed in an intermediate position of the first portion 31 so as to be spaced from the base 2 and not in contact with the base 2, placed below the first portion 31. For example, the temperature sensor 5 is placed at a distance of 1 mm from the base 2.

It should be noted that, in accordance with the second embodiment, the first portion 31 is in block form. In particular, in such an embodiment, the temperature sensor 5 is inserted inside the block, already connected to the conducting wire 6, as visible in FIGS. 4 and 5-6. The block is mountable on the base 2 and in particular in the groove 7, if present. It should be noted that the second embodiment is preferable in the case of shoes for guide bearings, or in general for shoes in which the base 2 has uneven or non-regular surfaces. In such a sense, the block can be suitably made to fit on the surface of the base 2, or on the groove 7 if provided, based on the shape of the surface or the groove 7 itself. However, such an embodiment is also applicable to thrust bearings, i.e., in the case of axial shoes, in which the surface of the base 2 is flat.

A different configuration of such an embodiment is shown in FIGS. 7-9, in which the temperature probe 4 comprises a temperature sensor 5 which is connected to three conducting wires 6.

The shoe 1 described above, in accordance with the first embodiment of the present invention, is obtained by means of the method described below. Such a method comprises a first step of depositing a layer of a first portion 31 of coating 3 made of insulating material on a metallic base 2, preferably on a groove 7 of the base 2. In particular, the deposit of the first portion 31 occurs by casting, or gluing, on the base 2. This is followed by the positioning, on the first portion 31, of a temperature sensor 5 connected to a conducting wire 6 having a free end 62. Following such a step, a layer of a second portion 32 of coating 3 made of insulating material is to be deposited on the first portion 31. The layer of the second portion 32 is preferably deposited within and outside the groove 7, enveloping the temperature sensor 5 and part of the conducting wire 6 and leaving the free end 62 outside the second portion 32. Also in such a case, preferably, the deposit of the second portion 32 on the first portion 31 occurs by casting or gluing. Lastly, the conducting wire 6 is cut flush with the second portion 32.

The shoe 1 described above, in accordance with the second embodiment of the present invention, is instead obtained by means of the method described below. Such a method comprises a first step of making a block comprising a first portion 31 of coating 3 made of insulating material in which a temperature sensor 5 is inserted. The temperature sensor 5 is connected to a conducting wire 6 having a free end 62. Preferably, the block is made by extrusion in the case of a coating 3 made of polymeric insulating material.

The block can alternatively be made by die-casting or with other processes.

Such a step is followed by a step of mounting the block on a metallic base 2, preferably in a groove 7 of the base 2.

This is followed by a further step of depositing a layer of a second portion 32 of coating 3 made of insulating material within and outside the groove 7, preferably by casting, enveloping the block and part of the conducting wire 6 and leaving the free end 62 outside the second portion 32.

Lastly, the conducting wire 6 is cut flush with the second portion 32.

The invention claimed is:

1. A shoe for hydrodynamic bearing configured to be placed in contact with a lubricating fluid, said shoe comprising:

a base made of metallic material;

a coating made of insulating material coupled to said base;

a temperature probe;

wherein said probe comprises a temperature sensor placed inside said coating, the temperature sensor being completely immersed within the coating; and a conducting wire extending between a first end connected to said temperature sensor and a second end facing outside said coating and configured to be in contact with said lubricating fluid, wherein said coating comprises a first portion connected to the base and a second portion placed on the first portion and configured to contact the lubricating fluid, said temperature sensor being interposed between said first portion and said second portion or being immersed in said first portion, said conducting wire being at least partially surrounded by the second portion, and wherein said base comprises at least one groove configured to house said first portion;

said second portion being deposited in the form of a layer on said first portion within and outside said groove.

2. The shoe according to claim 1, wherein said first portion is in the form of a layer uniformly placed within at least part of said groove, said temperature sensor being placed on said first portion and surrounded by said second portion.

3. A method for producing a shoe according to claim 2, comprising the steps of:

depositing a layer of a first portion of coating made of insulating material on a groove of a metallic base;

placing a temperature sensor connected to a conducting wire having a free end on said first portion;

depositing a layer of a second portion of coating made of insulating material on said first portion within and outside said groove, enveloping said temperature sensor and part of said conducting wire leaving the free end outside said second portion;

cutting the conducting wire flush with the second portion.

4. The shoe according to claim 2, wherein said first portion and said second portion are made of the same material.

5. The shoe according to claim 2, wherein at least one of said first portion and said second portion comprises PEEK and/or PTFE.

6. The shoe according to claim 1, wherein said first portion is in the form of a block mountable in said groove; said temperature sensor being inserted in said block.

7. A method for producing a shoe according to claim 6, comprising the steps of:

making a block comprising a first portion of coating made of insulating material in which a temperature sensor is inserted connected to a conducting wire having a free end;

mounting said block in a groove of a metallic base;

depositing a layer of a second portion of coating made of insulating material within and outside said groove enveloping said block and part of said conducting wire leaving the free end outside said second portion;

cutting the conducting wire flush with the second portion.

8. The shoe according to claim 6, wherein said first portion and said second portion are made of the same material.

9. The shoe according to claim 6, wherein at least one of said first portion and said second portion comprises PEEK and/or PTFE.

10. The shoe according to claim 1, wherein said first portion and said second portion are made of the same material.

11. The shoe according to claim 1, wherein at least one of said first portion and said second portion comprises PEEK and/or PTFE.

12. A bearing comprising the shoe according to claim 1.

13. The shoe according to claim 1, wherein said first portion and said second portion are made of the same material.

14. The shoe according to claim 1, wherein at least one of said first portion and said second portion comprises PEEK and/or PTFE.

15. A shoe for hydrodynamic bearing configured to be placed in contact with a lubricating fluid, said shoe comprising:

a base made of metallic material;

a coating made of insulating material coupled to said base;

a temperature probe;

wherein said probe comprises a temperature sensor placed inside said coating; and a conducting wire extending between a first end connected to said temperature sensor and a second end facing outside said coating and configured to be in contact with said lubricating fluid, wherein said coating comprises a first portion connected to the base and a second portion placed on the first portion and configured to contact the lubricating fluid, said temperature sensor being interposed between said first portion and said second portion or being immersed in said first portion, said conducting wire being at least partially surrounded by the second portion, and wherein said base comprises at least one groove configured to house said first portion;

said second portion being deposited in the form of a layer on said first portion within and outside said groove.

* * * * *